Feb. 15, 1944.   B. COTTER   2,341,597
WINDOW GUIDE INSTALLATION
Filed July 28, 1941   3 Sheets-Sheet 1
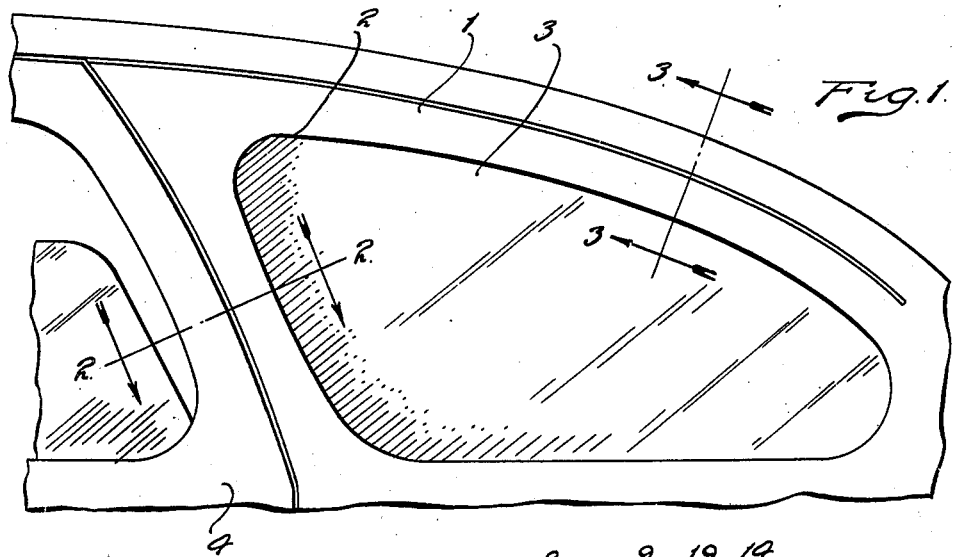
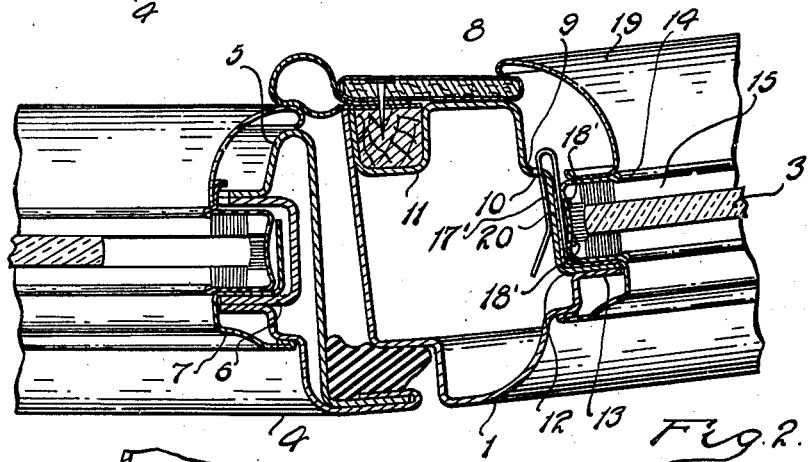
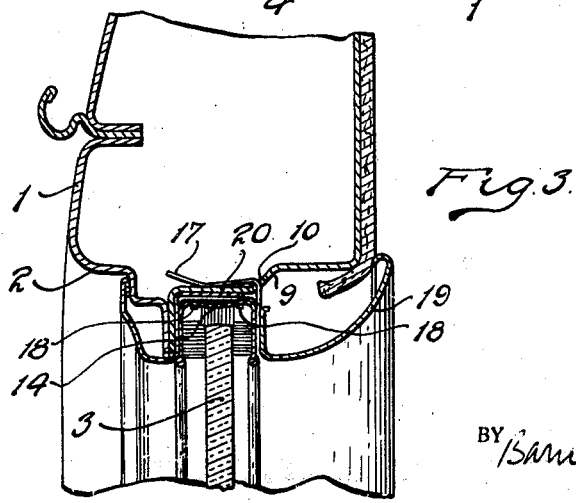
INVENTOR.
BART COTTER
BY
ATTORNEYS.

Feb. 15, 1944.　　　　B. COTTER　　　　2,341,597
WINDOW GUIDE INSTALLATION
Filed July 28, 1941　　　3 Sheets-Sheet 2
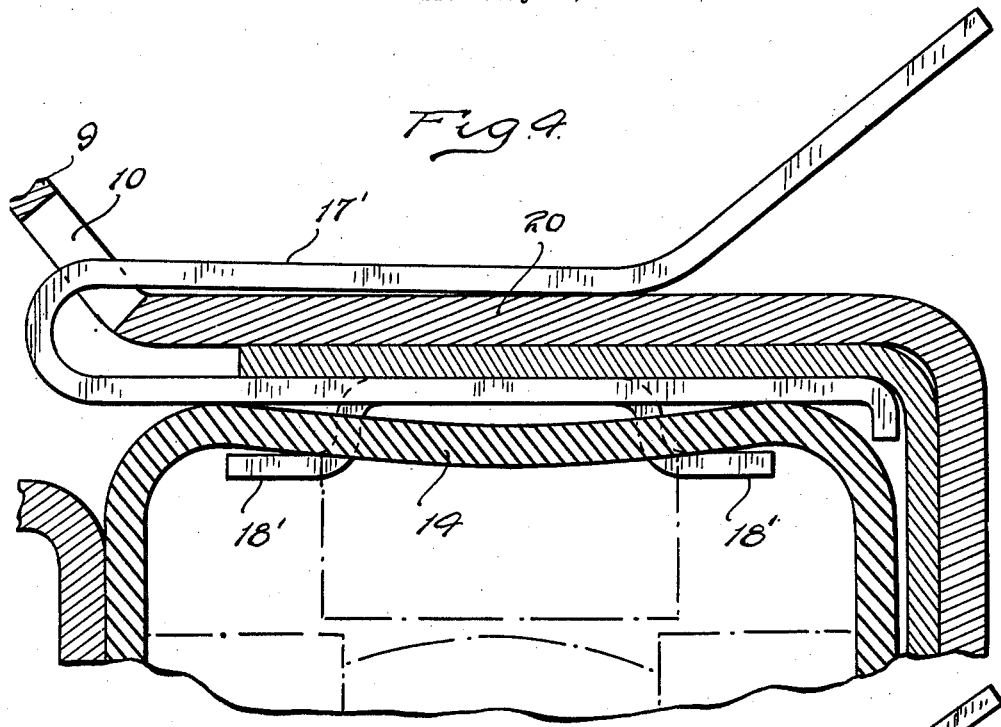
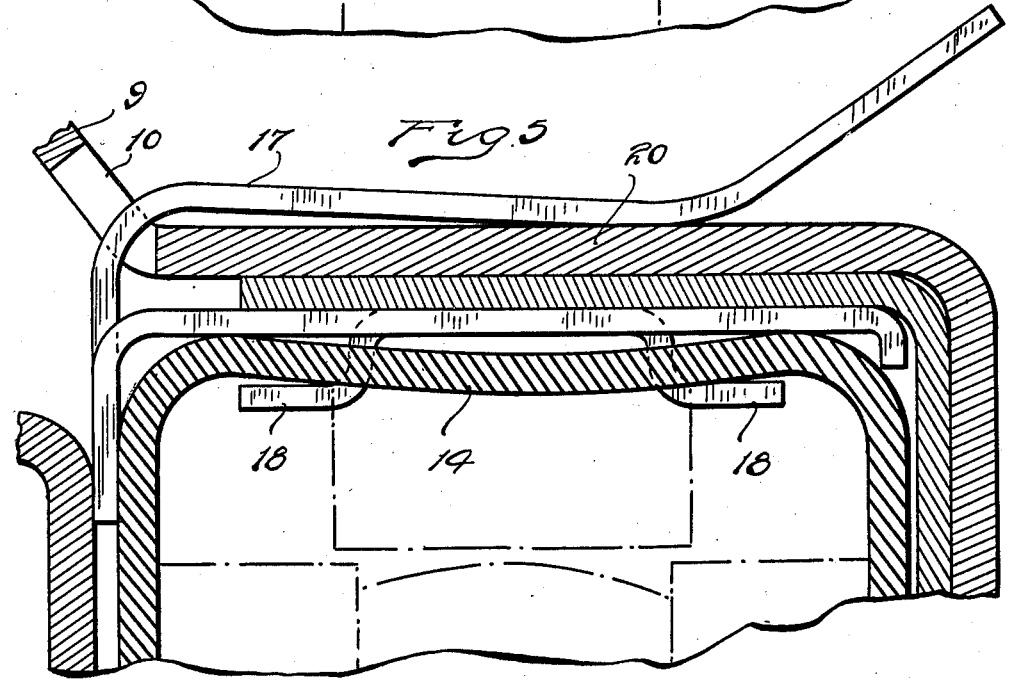
INVENTOR.
BART COTTER.
BY
ATTORNEYS Feb. 15, 1944.   B. COTTER   2,341,597
WINDOW GUIDE INSTALLATION
Filed July 28, 1941   3 Sheets-Sheet 3

INVENTOR.
BART COTTER.
BY Barnes, Kisselle, Laughlin & Kisch
ATTORNEYS

Patented Feb. 15, 1944

2,341,597

UNITED STATES PATENT OFFICE 2,341,597

WINDOW GUIDE INSTALLATION

Bart Cotter, Detroit, Mich., assignor to General Motors Corporation, Detroit, Mich., a corporation of Delaware Application July 28, 1941, Serial No. 404,353

5 Claims. (Cl. 296—44.5)

This invention relates to window channels and particularly to means for removably fastening the window channels in a metal automobile body.

It is the object of the invention to provide a very simple but effective means for securing in the automobile body the usual metal window channels which are lined with some kind of material provided with long bristles. The Simpson Patent 1,463,444 and Wetzel 1,674,382 afford examples of means for removably securing window channels in bodies but these designs require a suitable supporting channel for the full length of the window guide or channel.

It is the object of this invention to very much simplify and cheapen the construction by punching slots in the metal of the body surrounding the window opening and provide suitable spring clips in the spaced portions having spring legs which can pass through the slots and quickly and easily enable one to fasten the window channel in the window opening.

In the drawings

Fig. 1 is a side elevation of the rear quarter of an automobile body.

Fig. 2 is a section on the line 2—2 of Fig. 1.

Fig. 3 is a section on the line 3—3 of Fig. 1.

Fig. 4 is an enlarged section showing one form of the invention.

Fig. 5 is a similar section showing another form of the invention.

Figure 6:
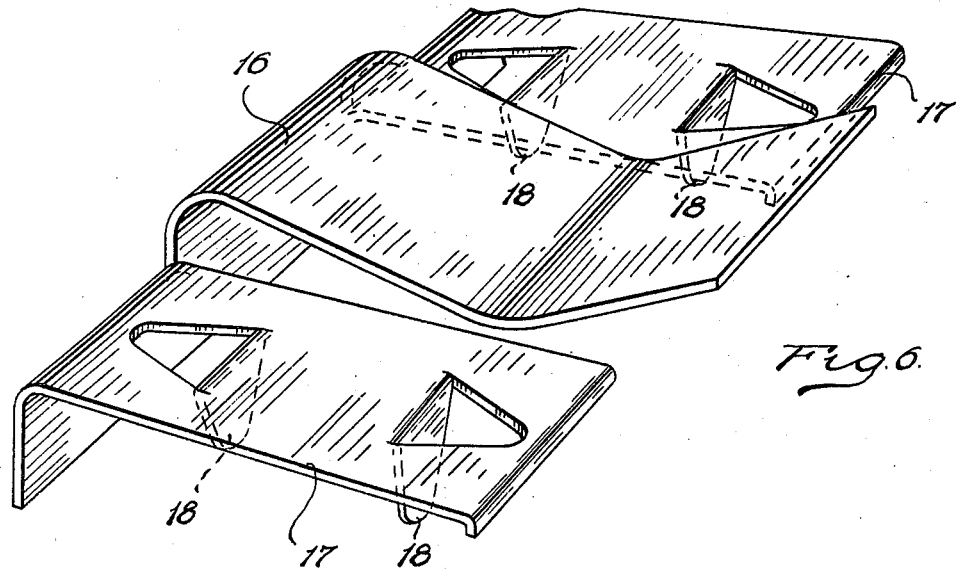
Fig. 6 is a perspective of the clip shown in Fig. 5.

1 designates the rear quarter panel which is provided with a rear quarter window opening 2. 3 designates the rear quarter glass panel. The rear door 4 is provided with a door post 5 having welded therein a channel strip 6 into which hooks the reveal molding 7. The rear quarter panel 1 forms a rear body post 8. This body post in the door opening is slightly offset and slots 10 are punched in the shoulder 9 formed by this offset. The inside metal panel 11 has turned up flanges 12 which match and are welded to the turned in flanges 13 of rear quarter panel 1. This forms a stop to hold the window channel 14. This window channel may be of the conventional construction with transverse slots made of soft metal so that the same may be easily bent to the shape of the window opening. Pads to cushion the window glass are provided by some suitable fabric with long bristles 15.

Figure 7:
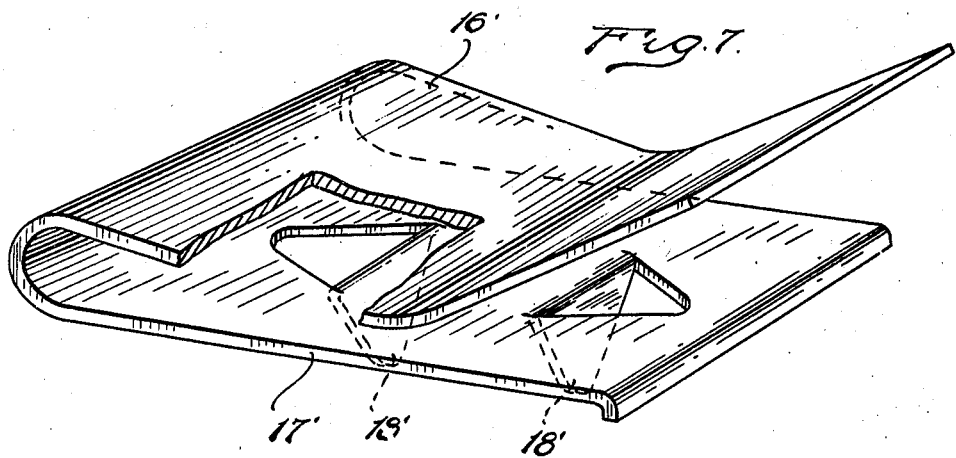
Fig. 7 is a perspective of the clip shown in Fig. 4.

My invention includes a clip such as shown in Fig. 6 where one modification appears, or such as shown in Fig. 7 where another modification is shown. The clip shown in Fig. 6 has an inwardly bowed spring arm 16 and at each side of this the straight arms 17. These straight arms are provided with struck out prongs 18. In the modification shown in Fig. 7 the spring arm is designated 16' and the straight arm is immediately below the spring arm and is designated 17'. The prongs 18' are struck out of this. These prongs are adapted to be pressed through the metal channel 14 as shown in Figs. 5 and 6 and then bent over to attach the clip to the channel. The prongs, as will be seen, are bent in opposite directions.

In order to fasten the sheet metal window channel in place in the window opening, all that is necessary is to provide a suitable number of slots 10 punched in the inner rear quarter panel and a suitable number of clips fastened to the window channel. The window channel may then be set in the window opening and the spring legs slipped in the slots 10. They frictionally grip the window channel bottom 20. This will securely fasten the channel in place by these spring clips. The channel may be easily yanked or pried out when it is necessary. After the channel has been fastened in place, the usual metal garnishing molding 19 may be secured in place by any suitable means. Reveal molding may be used on the outside of the rear quarter window for ornamental purposes.

What I claim is:

1. In an automobile body, an inner panel provided with a window channel portion having slots at one side thereof and to the outside of the bottom of the channel and a window channel having secured thereto spring metal clips, each clip having a folded portion that may pass transversely of the body through the said slot in the panel to removably secure the window channel in place by gripping the window channel bottom portion between the body of the clip and the folded over portion.

2. In an automobile body, an inner panel provided with a window channel bottom and provided with a shoulder spaced outwardly of the window opening and having slots at one side and to the outside of said channel bottom and a window channel having secured thereto spring metal clips, each clip having a folded over portion that may pass transversely of the body through the said slot in the panel to frictionally grip said channel bottom between the body of the clip and the folded over portion to removably secure the window channel in place.

3. In an automobile body, an inner panel provided with a window channel bottom and having slots at the side thereof and to the outside of said channel bottom and a window channel having secured thereto metal clips, each clip having a spring leg adapted to pass transversely of the body through the slot in the panel to frictionally grip the said channel bottom between the body of the clip and the spring leg and removably secure the window channel in place.

4. In an automobile body, an inner panel provided with a window channel bottom and provided with slots at one side and spaced to the outside of the outline of the window opening and a window channel having secured thereto metal clips, each clip having a bowed spring leg adapted to pass transversely of the body through the slot in the panel to frictionally grip said bottom between the body of the clip and the spring leg and removably secure the window channel in place.

5. In an automobile body, an inner panel provided with a window channel bottom and having slots at one side to the outside of the channel and a window channel having secured thereto metal clips, each clip having a portion folded back on another portion that may pass transversely of the body through the said slot in the panel to grip the window channel bottom between the body of the clip and the folded over portion and removably secure the window channel in place and provided with struck out prongs which may pierce the window channel and bent over to hold the clip to the channel.

BART COTTER.